Patent Number: 4,586,156
… Date of Patent: Apr. 29, 1986

[54] WORD PROCESSING SYSTEM FOR DISPLAYING INFORMATION IN FULL CHARACTER AND LAYOUT MODE

[75] Inventors: Kazuyuki Kurata; Kiyozi Motoki, both of Nara; Yoshihiro Yamada, Yamatokoriyama, all of Japan

[73] Assignee: Sharp Kabushiki Kaisha, Osaka, Japan

[21] Appl. No.: 640,222

[22] Filed: Aug. 13, 1984

Related U.S. Application Data

[63] Continuation of Ser. No. 357,081, Mar. 11, 1982, abandoned.

[30] Foreign Application Priority Data

Mar. 17, 1981 [JP] Japan .................................. 56-39073
Sep. 17, 1981 [JP] Japan .................................. 56-147100

[51] Int. Cl.$^4$ .......................... G06K 9/00; G06F 3/14
[52] U.S. Cl. .................................... 364/900; 340/731
[58] Field of Search ................ 340/731, 750; 364/200, 364/900

[56] References Cited

U.S. PATENT DOCUMENTS

| | | | |
|---|---|---|---|
| 4,094,000 | 6/1978 | Brudevold | 364/900 |
| 4,115,765 | 9/1978 | Hartke | 340/750 |
| 4,168,489 | 9/1979 | Ervin | 340/73.1 |
| 4,197,590 | 4/1980 | Sukonick et al. | 364/900 |
| 4,296,476 | 10/1981 | Mayer et al. | 364/900 |
| 4,373,194 | 2/1983 | Demke et al. | 340/73.1 |
| 4,418,345 | 11/1983 | Demke et al. | 340/73.1 |

Primary Examiner—Gareth D. Shaw
Assistant Examiner—Daniel K. Dorsey
Attorney, Agent, or Firm—Birch, Stewart, Kolasch & Birch

[57] ABSTRACT

A word processing system operates either in a normal display mode or in a layout display mode. In the normal display mode, characters are displayed on a display screen in a size suited for recognizing the contents. In the layout display mode, a full page layout is displayed through the use of symbols which are smaller than the characters in the normal display mode. In a preferred mode, 2×3 character positions are included in a block which corresponds to one character size of the normal display mode.

4 Claims, 7 Drawing Figures

WORD PROCESSING SYSTEM FOR DISPLAYING INFORMATION IN FULL CHARACTER AND LAYOUT MODE

This application is a continuation of application Ser. No. 357,081 filed on Mar. 11, 1982, now abandoned.

BACKGROUND AND SUMMARY OF THE INVENTION

The present invention relates to a monitor display in a word processing system.

In a word processing system it is desirable if the entire characters on one page are displayed on an image screen at a same time when the reformat operation is conducted. However, when the entire characters on one page are desired to be displayed on the image screen at the same time, the image screen must have a larger area as compared with the conventional CRT display system.

The normally used character display CRT has a display screen of 80 characters×25 lines (10 characters/inch, 6 lines/inch). Therefore, it is impossible to display the full page characters of one sheet of A4 paper (210 mm×297 mm, namely, 8.27 inches×11.69 inches). One way to display the full page characters on the conventional image screen is to reduce the size of the displayed character. However, the display becomes difficult to read, thus the reduced size display is not suited for conducting the editing operation.

Accordingly, an object of the present invention is to provide a display system in a word processing system for displaying a layout of a full page document.

Another object of the present invention is to provide a monitor display system in a word processor for ensuring an easy editing operation.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, characters are displayed in a normal size when the document data input operation is conducted. Thus, the operator can easily read the characters. When the full page layout is desired to be displayed, the system is placed in a layout monitor mode, wherein the layout pattern is displayed through the use of a specific symbol which is smaller than the characters in the normal operation mode.

BRIEF DESCRIPTION OF THE DRAWINGS

The present invention will be better understood from the detailed description given hereinbelow and the accompanying drawings which are given by way of illustration only, and thus are not limitative of the present invention and wherein.

DESCRIPTION OF THE PREFERRED EMBODIMENTS

Figure 1:
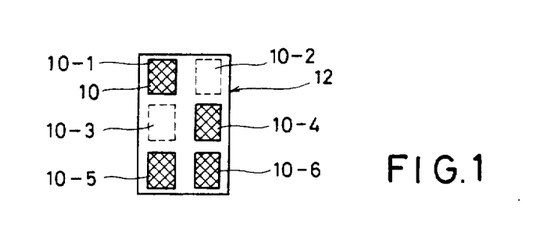
FIG. 1 is a plan view for explaining a symbol pattern for displaying a layout in a word processing system of the present invention.

FIG. 1 shows a symbol pattern which is used for displaying a layout in an embodiment of the word processing system of the present invention. The layout display is conducted through the use of symbols 10. Six (6) symbol display sections 10-1, 10-2, 10-3, 10-4, 10-5 and 10-6 are provided in one character display section 12. FIG. 1 shows a condition wherein the symbols 10 are displayed at the first row, first column (10-1), the second row, second column (10-4), the third row, first column (10-5) and the third row, second column (10-6) for indicating that the characters exist at the respective positions. The symbol display is not conducted at the first row, second column (10-2) and the second row, first column (10-3) for indicating that the characters do not exist at the respective positions. Sixty-four (64) kinds of matrix pattern (2×3) are prepared for indicating the character layout in a selected section.

In the normal data input operation, one character is displayed at the one character display section 12. Thus, the displayed character is large enough to recognize the contents. In the layout monitor mode, the full page layout is displayed through the use of the symbols 10.

Figure 2:
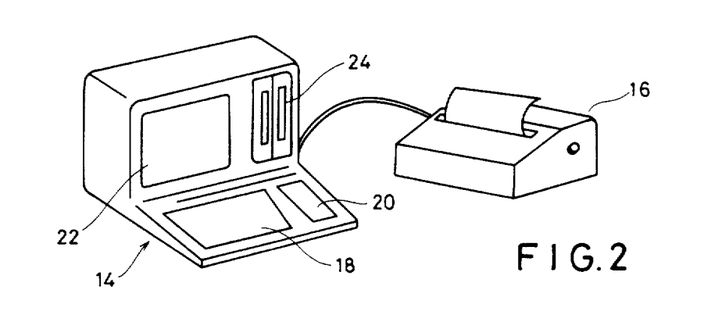
FIG. 2 is a perspective view of an embodiment of a word processing system of the present invention.

The word processing system of the present invention comprises a main unit 14 and a printer unit 16. The main unit 14 includes a character keyboard panel 18 for introducing the character data, a function keyboard panel 20 for introducing operation commands, a display unit 22 implemented, for example, with a CRT display of 80 characters×25 lines, and an outer memory unit 24 such as a floppy disc. The function keyboard panel 20 includes a mode selection key (Full Key F) for selecting the display condition between the normal display mode wherein the introduced characters are displayed and the layout display mode wherein the full page layout is displayed through the use of the symbols 10.

Figure 3:
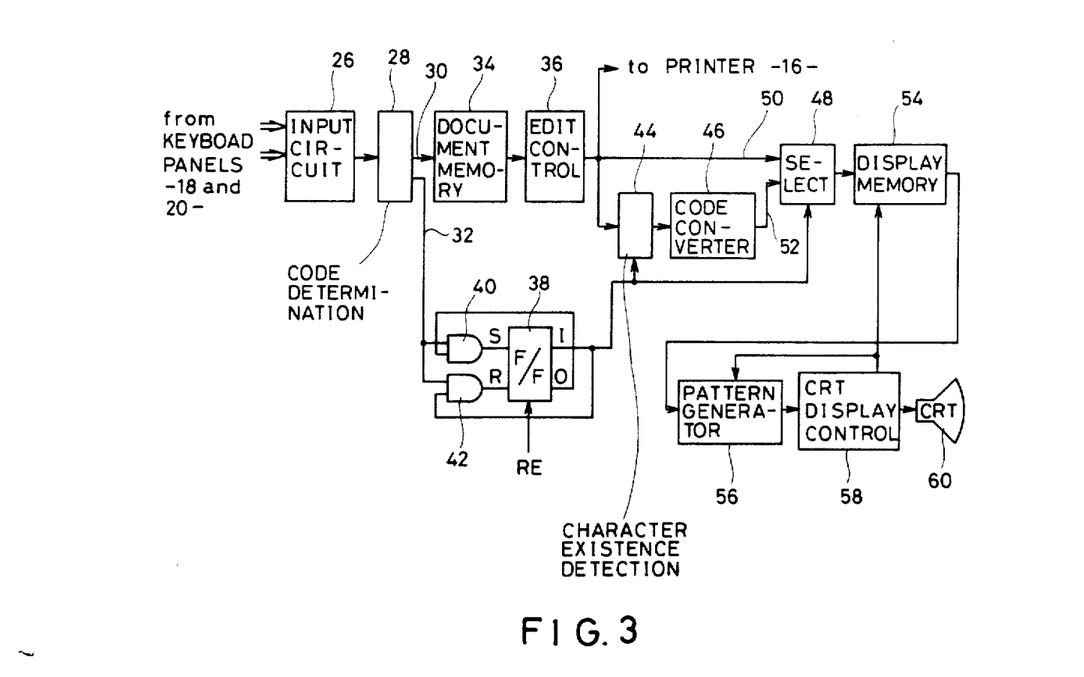
FIG. 3 is a schematic block diagram of a control circuit included in the word processing system of FIG. 2.

FIG. 3 schematically shows the construction of the main unit 14. The key input signals derived from the character keyboard panel 18 and the function keyboard panel 20 are introduced into an input circuit 26 which develops a coded signal in response to an actuated key. The coded signal developed from the input circuit 26 is applied to a code determination circuit 28. The code determination circuit 28 functions to enable a signal line 30 when the introduced coded signal corresponds to any one key included in the character keyboard panel 18 or corresponds to any key included in the function keyboard panel 20 other than the mode selection key (Full Key F). The code determination circuit 28 functions to enable the other signal line 32 when the introduced coded signal represents the actuation of the mode selection key (Full Key F).

When the keys other than the mode selection key (Full Key F) are actuated, the coded signal is introduced into a document memory 34 and stored therein in the order of the key actuation. An edit control circuit 36 is connected to receive the coded signals stored in the document memory 34. The edit control circuit 36 includes three (3) buffer registers each of which functions to store document information of one line. That is, the edit control circuit 36 temporarily stores the document information of three (3) lines. It is important that the edit control circuit 36 includes three (3) buffer registers for effecting the layout display in a manner as discussed with reference to FIG. 1.

The key actuation signal of the mode selection key (Full Key [F]) is transferred through the signal line 32 to a flip-flop 38 via AND gates 40 and 42. The flip-flop 38 is normally placed in the reset mode by means of a reset signal RE which is developed when the main power supply switch is switched on. When the mode selection key (Full Key [F]) is actuated, the flip-flop 38 is set via the AND gate 40, whereby the system is placed in the layout display mode. When the mode selection key (Full Key [F]) is again actuated, the flip-flop 38 is reset via the AND gate 42, whereby the system is placed in the normal operation mode, wherein the key inputted characters are displayed on the display unit 22 in the normal size.

A character existence detection circuit 44 is enabled when the flip-flop 38 is placed in the set condition, namely in the layout display mode. The character existence detection circuit 44 functions to introduce the data stored in the three (3) buffer registers included in the edit control circuit 36 in a parallel fashion. That is, the character existence detection circuit 44 detects whether character data exists in a specific position, and develops a first detection signal "1" when the character data exists, and a second detection signal "0" when the character data does not exist. The detection is conducted for each block consisting of three (3) row × two (2) column character positions as shown in FIG. 1. The detection output developed from the character existence detection circuit 44 is applied to a code converter 46. Detailed constructions of the edit control circuit 36, the character existence detection circuit 44 and the code converter 46 will be described later with reference to FIG. 5.

The word processing system of the present invention further includes a selection circuit 48 which selectively introduces the document data derived from the edit control circuit 36 and applied through a signal line 50, and the layout pattern data derived from the code converter 46 and applied through a signal line 52. More specifically, when the system is placed in the normal operation mode (the flip-flop 38 is reset), the selection circuit 48 functions to transfer the document data derived from the edit control circuit 36 to a display memory 54. When the system is placed in the layout display mode (the flip-flop 38 is set), the layout pattern data developed from the code converter 46 is applied to the display memory 54 via the selection circuit 48.

The data stored in the display memory 54 is applied to a pattern generator 56 in response to a synchronization signal developed from a CRT display control circuit 58 for displaying the characters in the normal operation mode or the layout pattern in the layout display mode on a CRT display screen 60 (display unit 22 in FIG. 2).

Figure 4:
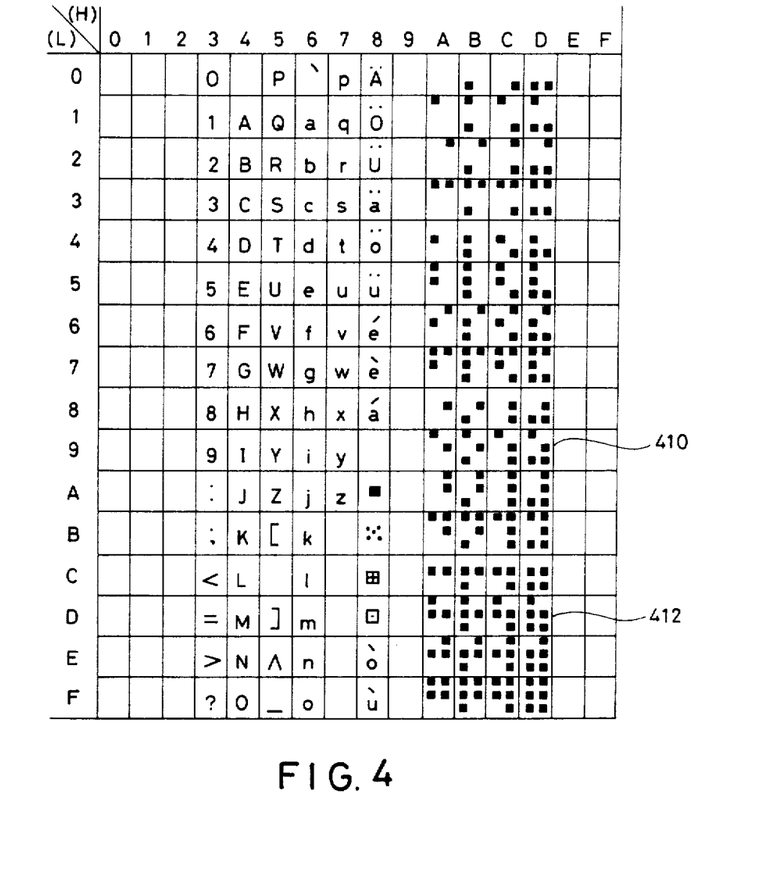
FIG. 4 is a plan view for explaining a pattern assignment of a pattern generator included in the control circuit of FIG. 3.

FIG. 4 shows relationships between the coded signals and the display patterns to be produced by means of the pattern generator 56. The document data introduced into the document memory 34 and the display data introduced into the display memory 54 are the coded signals of eight (8) bit construction. The upper four (4) bits of the coded signal correspond to the abscissa in the table of FIG. 4, and the lower four (4) bits of the coded signal correspond to the ordinate.

The abscissa and the ordinate in the table of FIG. 4 are represented by hexadecimal notation ("0" through "F"). Code signals "00110000" through "10001111" (30 through 8F) correspond to each character or symbol in the normal operation mode. Code signals "10100000" through "11011111" (AO through DF) correspond to each pattern in the layout display mode. The document data coded signal stored in the document memory 34 is included in the code signals "00110000" through "10001111". For example, the character "A" is represented by the coded signal "01000001" (41). The layout pattern data developed from the code converter 46 is included in the coded signals "10100000" through "11011111". For example, the layout pattern as shown in FIG. 1 is represented by the coded signal "11011001" (D9).

Figure 5:
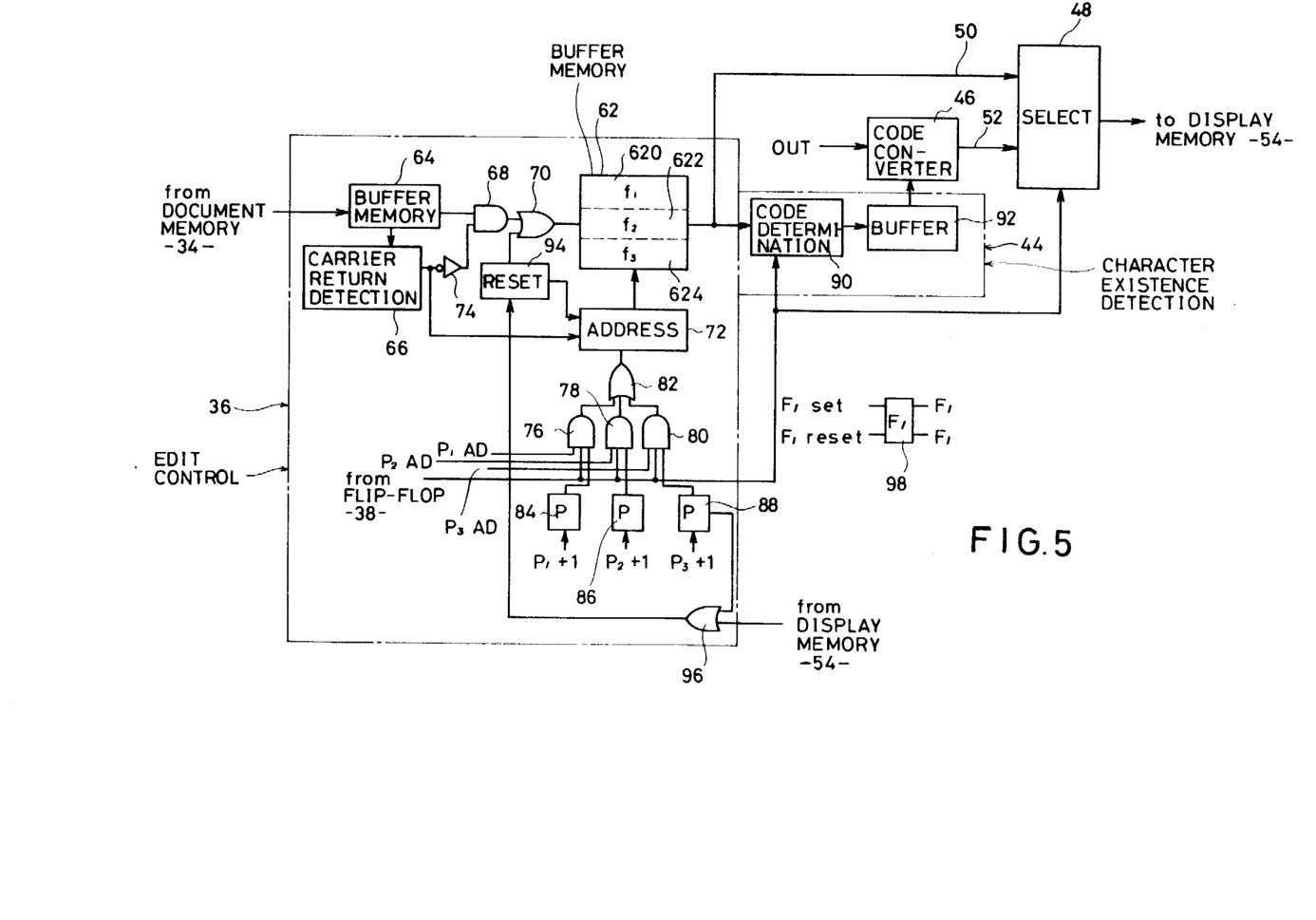
FIG. 5 is a block diagram of an essential part of an embodiment of the control circuit of FIG. 3.

FIG. 5 shows an essential part of the control circuit of FIG. 3. Like elements corresponding to those of FIG. 3 are indicated by like numerals.

The edit control circuit 36 includes a buffer memory 62 having three (3) buffer registers 620 ($f_1$), 622 ($f_2$) and 624 ($f_3$). The coded document data derived from the document memory 34 is applied to a document buffer memory 64 which has one byte capacity. A carrier return detection circuit 66 is connected to the document buffer memory 64 for detecting a coded signal representing the carrier return which is included in the coded document data introduced into the document buffer memory 64. When the carrier return code is detected, the carrier return detection circuit 66 develops a detection signal of logic "1". The coded document data temporarily stored in the document buffer memory 64 is applied to the buffer memory 62 via an AND gate 68 and an OR gate 70. As already discussed above, each of the buffer registers 620 ($f_1$), 622 ($f_2$) and 624 ($f_3$) has the memory capacity corresponding to one line of document data.

An address circuit 72 is provided for addressing a desired memory section in the buffer memory 62. The detection signal "1" developed from the carrier return detection circuit 66 is applied to the address circuit 72 for selecting the three buffer registers 620 ($f_1$), 622 ($f_2$) and 624 ($f_3$). The detection signal "1" developed from the carrier return detection circuit 66 is further applied to the other input terminal of the AND gate 68 via an inverter 74. Therefore, the character data developed from the document buffer memory 64 is first transferred to the buffer register 620 ($f_1$) of the buffer memory 62 via the AND gate 68 and the OR gate 70. When the carrier return code is detected by the carrier return detection circuit 66, the address circuit 72 functions to switch the buffer register from 620 ($f_1$) to 622 ($f_2$). Then, the following character coded data is introduced into the buffer register 622 ($f_2$).

The read-out operation of the document data stored in the buffer memory 62 is controlled through the use of a signal applied to the address circuit 72 via AND gates 76, 78 and 80, and an OR gate 82. Three (3) address pointers 84 ($P_1$), 86 ($P_2$) and 88 ($P_3$) are provided, each of which corresponds to one of the three (3) buffer registers 620 ($f_1$), 622 ($f_2$) and 624 ($f_3$) of the buffer memory 62. The address pointer 84 ($P_1$) is connected to the AND gate 76, the address pointer 86 (P$_2$) is connected to the AND gate 78, and the address pointer 88 (P$_3$) is connected to the AND gate 80.

The contents stored in the address pointer 84 (P$_1$) are increased by one when a control signal P$_1$+1 is applied thereto. The contents stored in the address pointers 86 (P$_2$) and 88 (P$_3$) are increased by one when control signals P$_2$+1 and P$_3$+1 are applied thereto, respectively. Address signals P$_1$AD, P$_2$AD and P$_3$AD are applied to the AND gates 76, 78 and 80, respectively. Further, the set output signal derived from the flip-flop 38 is applied to the AND gates 76, 78 and 80.

More specifically, the address pointer 84 (P$_1$) memorizes the address position of the buffer register 620 (f$_1$). The address pointer 86 (P$_2$) memorizes the address position of the buffer register 622 (f$_2$). The address pointer 88 (P$_3$) memorizes the address position of the buffer register 624 (f$_3$). The contents stored in the address pointers 84 (P$_1$), 86 (P$_2$) and 88 (P$_3$) are applied to the address circuit 72 via the AND gates 76, 78 and 80 and the OR gate 82, thereby sequentially reading out the document data stored in the buffer registers 620 (f$_1$), 622 (f$_2$) and 624 (f$_3$).

The thus read out document data derived from the buffer memory 62 is applied to the selection circuit 48 via the signal line 50, and to the character existence detection circuit 44. The character existence detection circuit 44 includes a code determination circuit 90, and a buffer register 92 which temporarily stores the determination output derived from the determination circuit 90 for a block consisting of 2×3 character positions. Thus, of a buffer register 92 is the six (6) bit construction. The output signal developed from the buffer register 92 is applied to the code converter 46 which functions to convert the data into a code signal of eight (8) bit construction as shown in FIG. 4. The thus converted code signal is applied to the selection circuit 48 via the signal line 52 in response to a control signal "OUT" applied to the code converter 46. The code determination circuit 90 is placed in an operative condition only when the set output is developed from the flip-flop 38, namely in the layout display mode.

A reset circuit 94 is provided for resetting the contents stored in the buffer memory 62 and the address circuit 72. The reset circuit 94 is responsive to a signal derived from an OR gate 96 which receives a carry signal developed from the address pointer 88 (P$_3$) and a control signal derived from the display memory 54. A flip-flop 98 functions to determine the condition when the character data stored in the buffer registers 620 (f$_1$), 622 (f$_2$) and 624 (f$_3$) of the buffer memory 62 is transferred to the code determination circuit 90 in a fashion that the two characters in one buffer register are taken out at the same time.

The document information introduced through the character keyboard panel 18 is memorized in the document memory 34. The thus memorized document information is read out and introduced into the document buffer memory 64 byte by byte. The document information includes, in addition to the character data, format codes such as the carrier return code and the tabulation code. For the purpose of simplicity, only the carrier return code is considered as the format code in the following description. Thus, the character data, which does not have the carrier return code, is transferred to the buffer memory 62. More specifically, when the coded data transferred to the document buffer memory 64 is not the carrier return code, the coded data is applied to the buffer register 620 (f$_1$) of the buffer memory 62 via the AND gate 68 and the OR gate 70. When the carrier return code is detected, the AND gate 68 is turned off, and the buffer register 622 (f$_2$) is selected through the use of the address circuit 72.

As already discussed above, the contents stored in the buffer registers 620 (f$_1$), 622 (f$_2$) and 624 (f$_3$) are initially reset to zero by the reset circuit 94. Therefore, the data "0" is stored in the buffer register 620 (f$_1$) at the remaining section if the carrier return code appears before the end of one line.

The following document data read out from the document memory 34 and applied to the document buffer memory 64 is introduced into the buffer register 622 (f$_2$). These operations are repeated to introduce the document data of three (3) lines into the buffer registers 620 (f$_1$), 622 (f$_2$) and 624 (f$_3$) for conducting the editing operation.

In the normal display mode, the selection circuit 48 selects the signal line 50 because the flip-flop 38 is in the reset state. Accordingly, the document data stored in the buffer registers 620 (f$_1$), 622 (f$_2$) and 624 (f$_3$) is introduced into the display memory 54, and applied to the printer unit 16.

Figure 6:
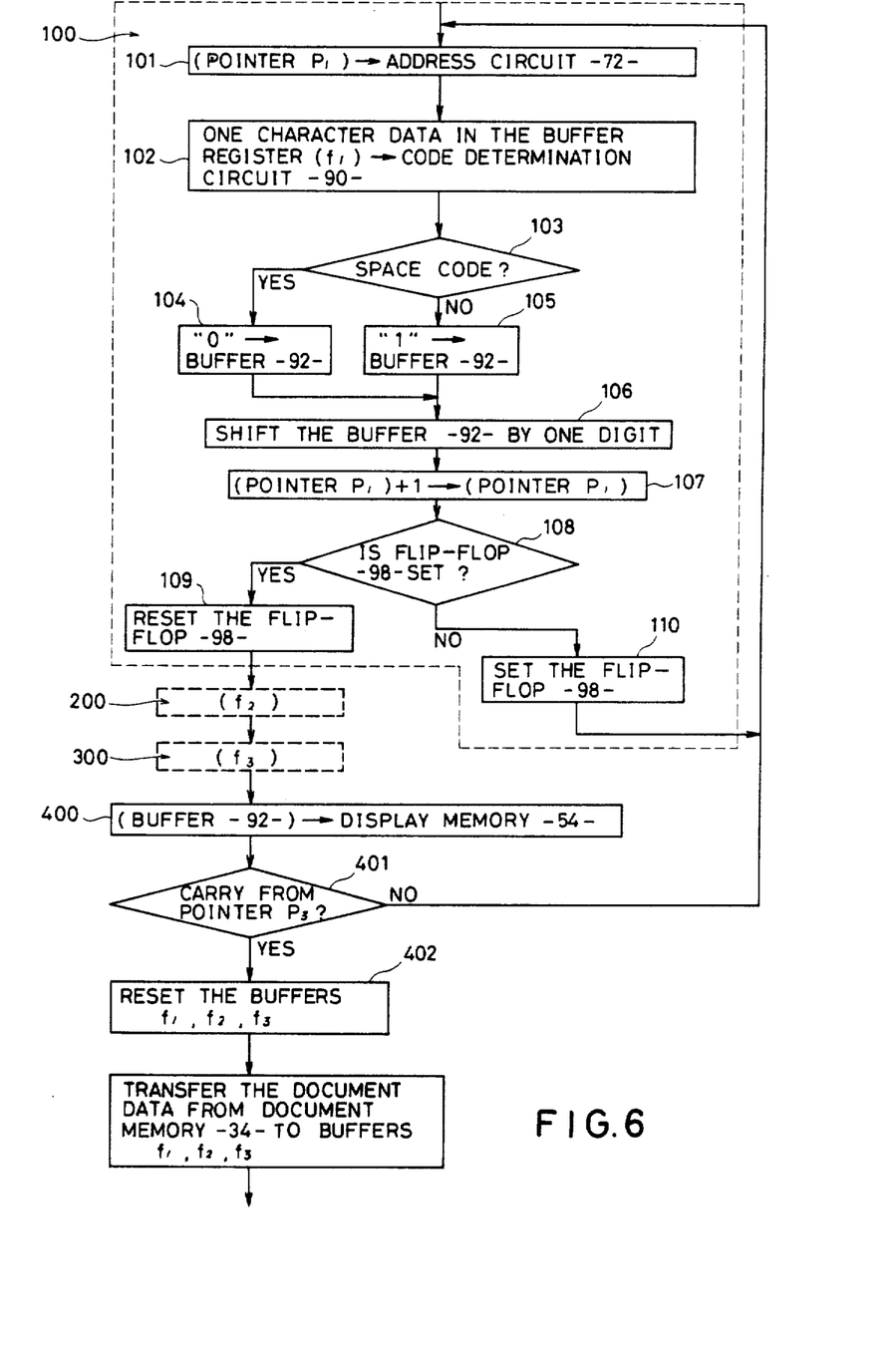
FIG. 6 is a flow chart for explaining an operational mode of the control circuit of FIG. 5.

When the mode selection key (Full Key [F]) is actuated, the system is placed in the layout display mode, and the operation is conducted in accordance with the layout display program as shown in the flow chart of FIG. 6. In the layout display mode, the flip-flop 38 is set and, therefore, the selection circuit 48 selects the signal line 52, and the AND gates 76, 78, 80 and the character existence detection circuit 44 are placed in the operative condition.

The operation flow is divided into three groups 100, 200 and 300. The operation flow 100 is associated with the buffer register 620 (f$_1$), the operation flow 200 is associated with the buffer register 622 (f$_2$), and the operation flow 300 is associated with the buffer register 624 (f$_3$). In the following description, only the operation flow 100 is described in detail for the purpose of simplicity.

In order to read out the first data stored in the buffer register 620 (f$_1$) and determine the contents at the code determination circuit 90, the address signal P$_1$AD is developed to turn on the AND gate 76. The address data stored in the address pointer 84 (P$_1$) (the initial value is set to address the first address of the buffer register 620 (f$_1$)) is applied to the address circuit 72 via the OR gate 82 (step 101 in FIG. 6).

The first coded data stored in the buffer register 620 (f$_1$) is read out and introduced into the code determination circuit 90 (step 102). The code determination circuit 90 develops a detection signal "1" when the introduced coded data represents any one of the characters. The code determination circuit 90 develops a detection signal "0" when the introduced data is the space code. The thus developed detection signal is introduced into and stored in the buffer register 92 (steps 103, 104 and 105). After introduction of the detection signal, the buffer register 92 is shifted by one digit (step 106). The control signal P$_1$+1 is developed to increase the contents stored in the address pointer 84 (P$_1$) by one (step 107).

Then, the determination as to whether the flip-flop 98 is set is conducted. The flip-flop 98 is held at the reset state in the initial condition. Therefore, the program is advaced from the step 108 to the step 110 at which the flip-flop 98 is turned to set. Then, the program is returned to the step 101.

The contents stored in the address pointer 84 ($P_1$) are introduced into the address circuit 72 (step 101) for reading out the second coded data stored in the buffer register 620 ($f_1$) (step 102). The detection signal developed from the code determination circuit 90 is written into the buffer register 92 (steps 103, 104 and 105). The buffer register 92 is shifted by one digit at the step 106 and the contents stored in the address pointer 84 ($P_1$) are increased by one at the step 107. Then, the flip-flop 98 is checked at the step 108. Since the flip-flop 98 is in the set state, the program is advanced to the step 109. The flip-flop 98 is turned to reset, and the program is advanced to the flow 200.

In the flow 200, the coded data of the first two character positions stored in the buffer register 622 ($f_2$) is checked, and the detection result is written into the buffer register 92. In the flow 300, the first two characters stored in the buffer register 624 ($f_3$) is checked, and the determination result is written into the buffer register 92.

In this way, the 6 (six) bit determination result is written into the buffer register 92. The thus obtained 6 (six) bit determination result is converted into an eight (8) bit code signal by the code converter 46. The eight (8) bit code signal is transferred to the display memory 54 via the signal line 52 and the selection circuit 48 in response to the control signal "OUT" (step 400).

The above-mentioned operation is repeated till the carry signal is developed from the address pointer 88 ($P_3$). When the determination operation has been conducted for the entire contents stored in the buffer registers 620 ($f_1$), 622 ($f_2$) and 624 ($f_3$), the carry signal is developed from the address pointer 88 ($P_3$). The carry signal is applied to the reset circuit 94 via the OR gate 96 (step 401), thereby resetting the buffer registers 620 ($f_1$), 622 ($f_2$) and 624 ($f_3$) and the address circuit 72 (step 402). Then, the document information of the following three (3) lines is introduced into and stored in the buffer registers 620 ($f_1$), 622 ($f_2$) and 624 ($f_3$). The determination operation is conducted for the thus introduced document data. In this way, the determination result covering one page document information is stored in the display memory 54.

The thus obtained data stored in the display memory 54 is sequentially read out in synchronization with the scanning operation of the CRT display control circuit 58. The eight (8) bit code signal derived from the determination result belongs to the code signals 10100000 to 11011111 (A0 to DF) shown in FIG. 4. As already discussed, in the layout display mode, the layout pattern covering 2×3 characters is displayed in one character position through the use of symbols.

Figure 7:
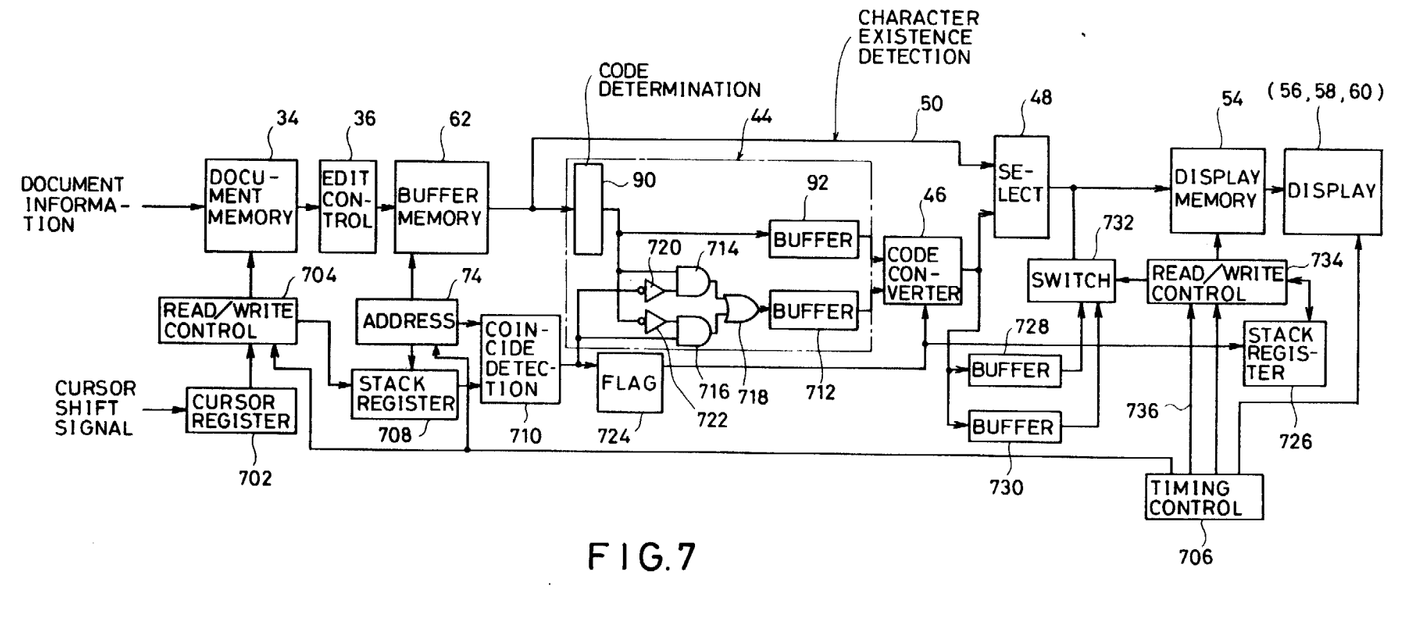
FIG. 7 is a block diagram of an essential part of another embodiment of the control circuit of FIG. 3.

FIG. 7 shows another embodiment of the control system of the present invention, wherein a cursor position is indicated in the layout display mode. Like elements corresponding to those of FIGS. 3 and 5 are indicated by like numerals.

Now assume that the cursor is located at the first character position in the second line in case where the characters are provided in a format as shown in FIG. 1. In this case, the layout pattern 410 (see FIG. 4) (D9) and the layout pattern 412 (see FIG. 4) (DD) are alternately selected, whereby the first character position in the second line is driven to blink.

A cursor shift key is included in the function keyboard panel 20. A cursor shift signal developed from the cursor shift key is introduced into a cursor register 702 which stores the information related to the cursor position in the document data stored in the document memory 34. A read/write control circuit 704 is disposed between the cursor register 702 and the document memory 34. The read/write control circuit 704 functions to address the document memory 34 in response to a timing signal developed from a timing control circuit 706.

When the address data stored in the read/write control circuit 704 becomes identical with the address data stored in the cursor register 702 while the document data is read out from the document memory 34, a coincide detection signal is developed from the read/write control circuit 704. The thus developed coincide detection signal is applied to a stack register 708 which functions to introduce the address data stored in the address circuit 74 when the coincide detection signal is applied from the read/write control circuit 704. That is, the stack register 708 stores the address data representing the cursor position. A coincide detection circuit 710 is connected to the stack register 708 and the address circuit 74 for developing a detection output when the address data stored in the address circuit 74 becomes identical with the address data memorized in the stack register 708 while the document data is read out from the buffer memory 62.

The detection signal developed from the code determination circuit 90 is applied to, in addition to the buffer register 92, another buffer register 712 via AND gates 714 and 716 and an OR gate 718. Inverters 720 and 722 are disposed in front of the AND gates 714 and 716, respectively. Under the condition where the coincide detection circuit 710 does not develop the detection output, that is, when the output signal of the coincide detection circuit 710 is logic "0", the detection signal developed from the code determination circuit 90 is introduced into the buffer register 712 via the AND gate 714. Under the condition where the coincide detection circuit 710 develops the detection output, that is, when the output signal of the coincide detection circuit 710 is logic "1", the inverted detection signal of the code determination circuit 90 is introduced into the buffer register 712 via the inverter 722 and the AND gate 718. It will be clear that the buffer register 712 stores the data which is inverted at the cursor position as compared with the data stored in the buffer register 92. In case where the cursor is located at the first character position in the second line and the characters are aligned in a fashion as shown in FIG. 1, the buffer register 92 stores the data corresponding to the layout pattern 410 shown in FIG. 4, and the buffer register 712 stores the data corresponding to the layout pattern 412 shown in FIG. 4.

When the detection output is developed from the coincide detection circuit 710, a flag 724 is set to indicate that the cursor position is included in the data now stored in the buffer registers 92 and 712. The set output of the flag 724 is applied to the code converter 46 and to a stack register 726. When the flag 724 is in the set state, the code converter 46 functions to apply the layout pattern data corresponding to the data stored in the buffer register 92 to a buffer register 728, and the layout pattern data corresponding to the data stored in the buffer register 712 to a buffer register 730, respectively. The layout pattern data stored in the buffer registers 728 and 730 are transferred to the display memory 54 via a switching circuit 732.

A read/write control circuit 734 is provided for controlling the data write operation into the display memory 54 and the data read-out operation from the display memory 54. The read/write control circuit 734 is connected to the stack register 726 so that the address data at the time when the flag 724 is turned set is introduced into and stored in the stack register 726. That is, while the display code data is written into the display memory 54, the address data representing the cursor location is introduced into and memorized in the stack register 726.

A timing signal of a predetermined frequency, for example, having a period of 300 milliseconds, is developed from the timing control circuit 706 and applied to the read/write control circuit 734 through a signal line 736. The read/write control circuit 734 controls the switching circuit 732 in response to the thus introduced timing signal, thereby alternately introducing the layout pattern data stored in the buffer registers 728 and 730 into the display memory 54. The activation of the switching circuit 732 is controlled in accordance with the address information stored in the stack register 726.

The remaining construction is similar to that shown in FIG. 5. In the layout display mode, the system shown in FIG. 7 is convenient because the symbol corresponding to the cursor position blinks due to the provision of the switching circuit 732 and the two buffer registers 728 and 730. When the system is returned to the normal display mode, the character block including the cursor position determined by the cursor register 702 is selected so that data input operation is immediately conducted.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A word processing display system for selectively displaying information in full character and layout modes, comprising:
   input means for providing document information including character codes;
   document memory means, responsive to said input means, for storing said document information provided thereby;
   display memory means for storing display data as display codes representative of desired information to be displayed, said display memory means storing said document information therein when in said full character mode;
   pattern generator means for storing patterns representing characters therein and for converting said display codes stored in said display memory means into said patterns specified by said display codes;
   display means for displaying desired information;
   display control means for reading out said display data stored in said display memory means and applying said display codes stored therein to said pattern generator means for generating patterns and for controlling said pattern generation means;
   said pattern generation means being responsive to said display control means to supply said patterns to said display means for display thereby;
   layout mode selection means for selecting said layout mode;
   layout display code generation means responsive to selection of said layout mode by said layout mode selection means for developing layout codes representative of character sized visual indicators of the presence or absence of characters at more than one character location, said layout display code generation means developing said layout codes from said document information stored in said document memory means and supplying said layout codes to said display memory means for storage therein;
   said pattern generator means also storing patterns therein representative of said character signal visual indicator and converting said layout codes into said patterns specified thereby.

2. The system of claim 1 wherein each said character signal visual indicator displays the existence of a character at each of said more than one character locations using a symbol commonly representing all said characters.

3. The display system of claim 1, said layout display code generator means comprising:
   buffer memory means for temporarily storing said document information stored in said document memory means,
   said buffer memory means including three buffer registers for storing said document information of three lines at the same time;
   said document information including character and space codes;
   character existence detection means responsive to said document information for detecting said character and space codes included in the said document information stored in said three buffer registers,
   said character existence detection means developing a first detection signal when a said character code exists, and a second detection signal when said space code exists;
   read control means for transferring said document information stored in said three buffer registers to said character existence detection means in a block by block fashion,
   said block consisting of six character positions made of two character positions in each of said buffer registers; and
   code converter circuit means responsive to said first and second detection signals for developing said layout code in accordance therewith;
   said layout code representing the characters positioned in said block.

4. The display system of claim 3, further comprising:
   a cursor register for storing an address data at which a cursor locates; and
   blink display control means for blinking a symbol displayed on said display screen at a position corresponding to said address data stored in said cursor register.

* * * * *